United States Patent [19]

Liu

[11] Patent Number: 5,148,830

[45] Date of Patent: Sep. 22, 1992

[54] FLOW CONTROL DEVICE

[76] Inventor: Hung Liu, 58, Ma Yuan West St., Taichung, Taiwan

[21] Appl. No.: 753,613

[22] Filed: Aug. 30, 1991

[51] Int. Cl.$^5$ ............................................. F16K 5/10
[52] U.S. Cl. ................................ 137/513.7; 137/599; 251/344
[58] Field of Search ............... 137/513.7, 599, 599.1; 251/117, 344

[56]  References Cited

U.S. PATENT DOCUMENTS

| 2,924,237 | 2/1960 | Ellis | 251/344 |
| 4,037,623 | 7/1977 | Beswick | 137/599 |
| 4,396,154 | 8/1983 | Iovino et al. | 251/344 |
| 4,466,461 | 8/1984 | Weiss | 251/344 X |

Primary Examiner—Stephen M. Hepperle

[57] ABSTRACT

A flow control device including a body having an annular flange formed in a middle portion, a pair of sealing rings engaged on the body, two apertures formed in the body and located between the sealing rings, a plug and a spring received between the annular flange and a coupler, and a sleeve threadedly engaged on the body and a gap formed between the sleeve and the body, fluid flowing from the coupler may flow through one aperture and the gap and the other aperture and may flow into the other end of the body, and the plug will be pushed against the spring when the fluid flows into the body from the other end of the body such that the fluid may flow through the bore of the body and may flow out of the coupler.

3 Claims, 4 Drawing Sheets

FLOW CONTROL DEVICE

BACKGROUND OF THE INVENTION

1. Field of the Invention

The present invention relates to a control device, and more particularly to a flow control device.

2. Description of the Prior Art

A typical flow control device is disposed between two sections of pipes or tubes and generally occupies a large volume which correspondingly requires a plurality of parts. The manufacturing fees thereof are expensive.

The present invention has arisen to mitigate and/or obviate the afore-described disadvantages of the conventional flow control devices.

SUMMARY OF THE INVENTION

The primary objective of the present invention is to provide a flow control device which includes few parts so that the cost thereof is cheap.

In accordance with one aspect of the present invention, there is provided a flow control device including a body which is cylindrical including a bore having an annular flange formed in a middle portion, a pair of sealing rings engaged on the body, two apertures formed in the body and located between the sealing rings, the annular flange being located between the apertures, a plug and a spring received in one end of the body, a coupler engaged to the body, the spring being biased between the plug and the coupler so that the plug can be biased toward the annular flange of the body in order to close the bore of the body, and a sleeve threadedly engaged on the body and engaged on the sealing rings so that the sleeve is movable longitudinally relative to the body, and arranged such that a gap is formed between the sleeve and the body, fluid flowing from the coupler into the body may flow through the first aperture and the gap and the second aperture and may flow into the other end of the body, the plug will be pushed against the spring when the fluid flows into the body from the other end of the body such that the fluid may flow through the bore of the body and may flow out of the coupler.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
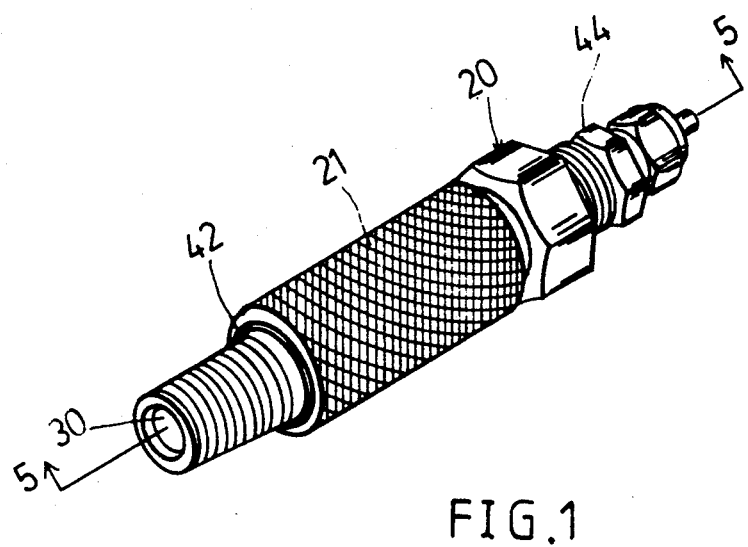
FIG. 1 is a perspective view of a flow control device in accordance with the present invention.
Figure 2:
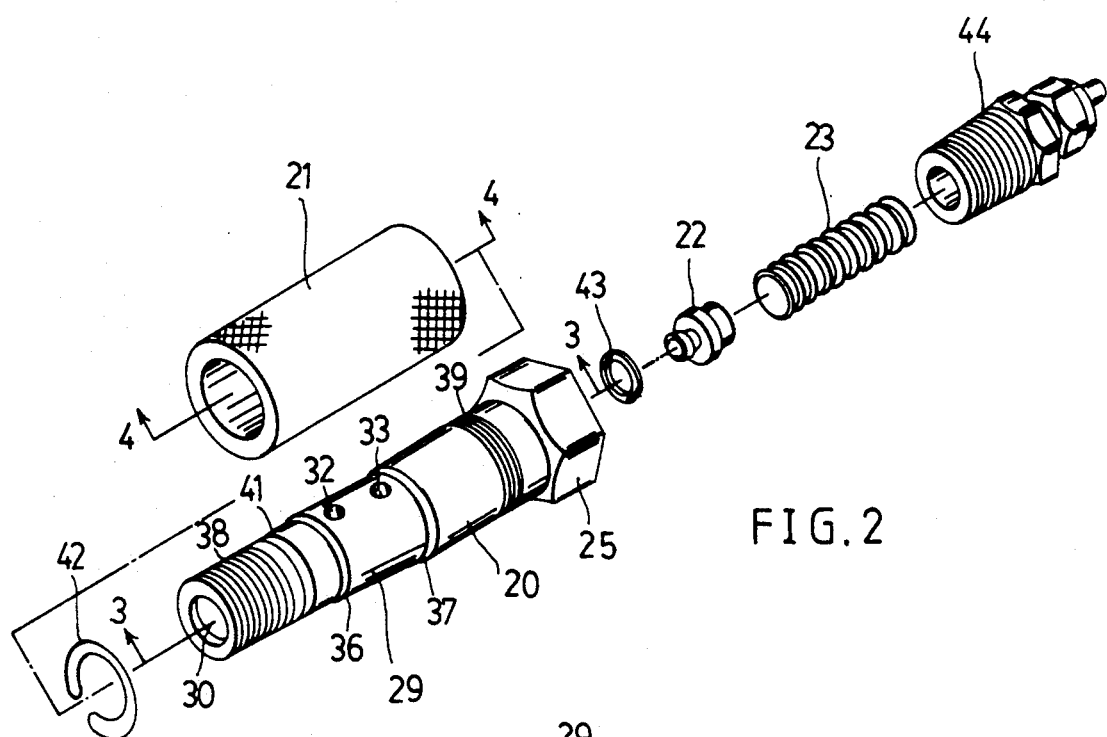
FIG. 2 is an exploded view of the flow control device.
Figure 3:
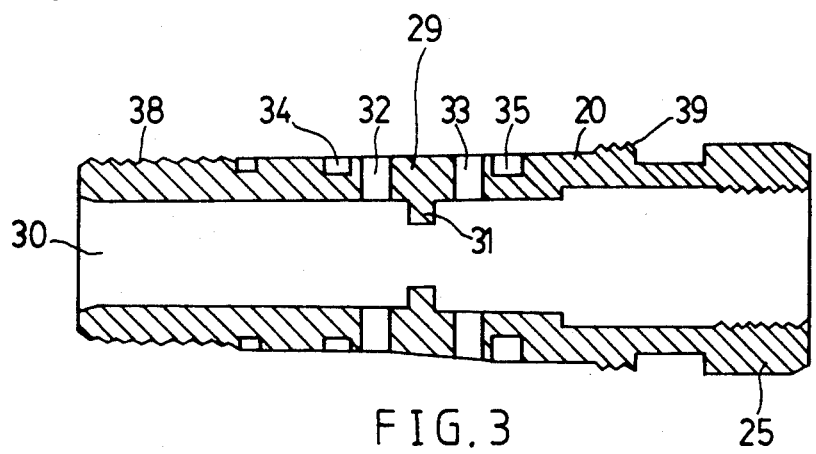
FIG. 3 is a cross sectional view taken along lines 3—3 of FIG. 2.
Figure 4:
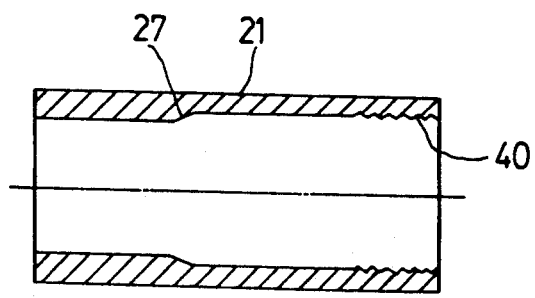
FIG. 4 is a cross sectional view taken along lines 4—4 of FIG. 2.

Referring to the drawings and initially to FIGS. 1 to 5, a flow control device in accordance with the present invention comprises generally a body 20 which is substantially cylindrical having a bore 30 longitudinally formed in the center thereof. An annular flange 31 is formed in the middle portion of the bore 30 and extends radially inward of the bore 30. Two pairs of apertures 32, 33 are oppositely formed in the body 20, in which one pair of the apertures 32 are formed on one side of the annular flange 31, and the other pair of the apertures 33 are formed on the other side of the annular flange 31. Two annular grooves 34, 35 are formed in the outer peripheral surface of the body 20 for receiving two sealing rings 36, 37 and are arranged such that the apertures 32, 33 are located therebetween. An outer thread 38 is formed in the first end of the body 20 for engagement to a pipe or the like. An outer thread 39 and a nut 25 are formed in the second end of the body 20. An annular groove 41 is formed beside the outer thread 38 for receiving a sealing ring 42.

Figure 5:
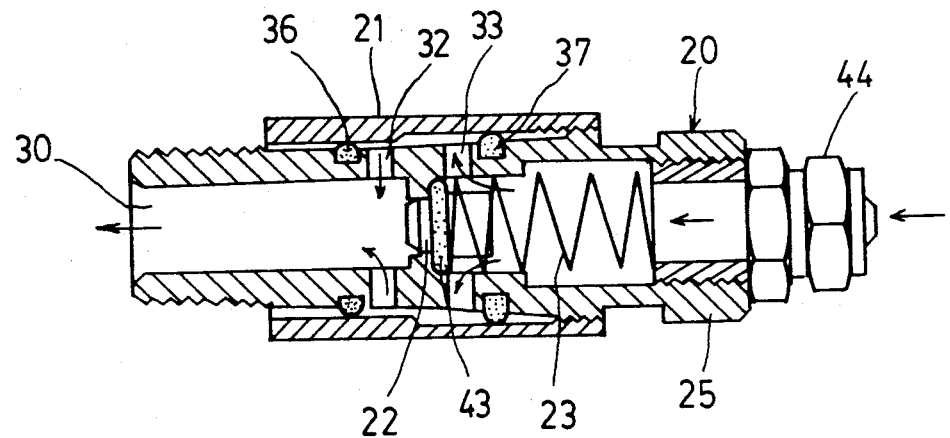
FIG. 5 is a cross sectional view taken along lines 5—5 of FIG. 1.

A sealing ring 43 is engaged on a first side of a plug 22. A spring 23 is engaged on the second side of the plug 22. A coupler 44 is threadedly engaged in the second end of the body 20. The spring 23 is biased between the plug 22 and the coupler 44 so that the sealing ring 43 can be biased to engage with the annular flange 31 of the body 20, as shown in FIG. 5, so that the middle portion of the bore 30 can be closed by the plug 22 and sealed by the sealing ring 43. A sleeve 21 has an inner thread 40 formed in one end for threaded engagement with the outer thread 39 of the body 20 so that the sleeve 21 is movable longitudinally relative to the body 20. An annular shoulder 27 is formed in the middle portion of the sleeve 21. A gap is formed between the sleeve 21 and the body 20.

Figure 6:
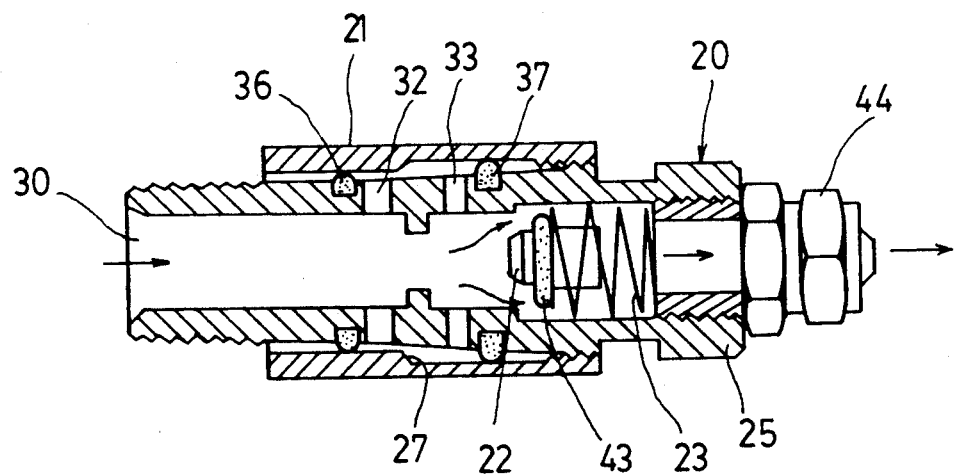
FIG. 6 is a cross sectional view similar to FIG. 5, illustrating the operation of the device.

In operation, as shown in FIG. 5, when air or other fluid flows through the coupler 44 into the body 20, the plug 22 is further pushed to close the middle portion of the bore 30 such that the fluid is caused to flow through the apertures 33 and the gap formed between the body 20 and the sleeve 21 and such that the fluid may flow out of the first end of the body 20. However, as shown in FIG. 6, when the fluid flows into the body 20 from the first end thereof, the plug 22 will be pushed against the spring by the fluid pressure such that the fluid can flow directly through the bore 30 of the body 20 and may flow out of the coupler 44.

Figure 7:
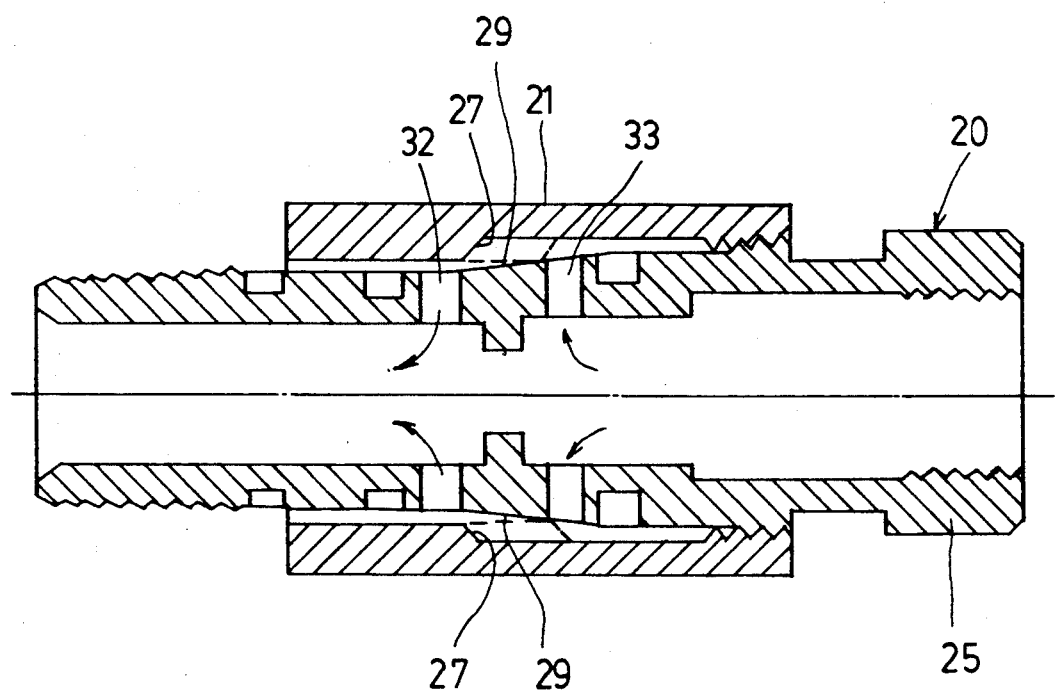
FIG. 7 is a schematic view illustrating the operation of the flow control device.

As shown in FIG. 7, it is to be noted that a tapered surface 29 is formed between the annular grooves 34, 35 (FIG. 2) of the body 20. When the sleeve 21 moves toward the second end of the body 20, the annular shoulder 27 of the sleeve 21 is caused to move toward the tapered surface 29 such that the gap formed between the sleeve 21 and the body 20 becomes narrower. On the contrary, the gap will be enlarged when the sleeve 21 moves toward the first end of the body 20, such that the flow speed and the volume of flow of the fluid which flows from the coupler 44 to the first end of the body 20 can be adjusted by the relative movement between the sleeve 21 and the body 20.

Accordingly, the flow speed of the fluid can be controlled by the flow control device in accordance with the present invention. The flow control device includes few parts only such that the manufacturing cost thereof is greatly lowered.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A flow control device comprising:
   a body which is substantially cylindrical including a bore having an annular flange formed in a middle portion thereof, a pair of sealing rings engaged on a middle portion of an outer peripheral surface thereof, a first aperture and a second aperture formed in said body and located between said sealing rings, said annular flange being located between said apertures;
   a plug and a spring received in one end of said body;
   a coupler engaged to said one end of said body, said spring being biased between said plug and said coupler so that said plug can be biased toward said annular flange of said body in order to close said bore of said body; and
   a sleeve threadedly engaged on said body and engaged on said sealing rings so that said sleeve is movable longitudinally relative to said body, and arranged such that a gap is formed between said sleeve and said body;
   fluid flowing from said coupler into said body may flow through said first aperture and said gap and said second aperture and may flow into the other end of said body; said plug will be pushed against said spring when said fluid flows into said body from the other end of said body such that said fluid may flow through said bore of said body and may flow out of said coupler.

2. A flow control device according to claim 1, wherein a tapered surface is formed on said outer peripheral surface of said body and is formed between said sealing rings, an annular shoulder is formed in an inner peripheral surface of said sleeve and is movable toward and away from said tapered surface of said body when said sleeve moves relative to said body such that an opening size of said gap can be adjusted.

3. A flow control devcice according to claim 1, wherein a second sealing ring is engaged on said plug and can be biased toward said annular flange by said spring.

* * * * *